United States Patent
Takeda et al.

(10) Patent No.: US 6,294,736 B1
(45) Date of Patent: Sep. 25, 2001

(54) PROTECTOR FOR FIXING WIRE HARNESS

(75) Inventors: Ikuo Takeda; Yasuyoshi Goto; Kenji Yamazaki, all of Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/299,599

(22) Filed: Apr. 27, 1999

(30) Foreign Application Priority Data

Apr. 28, 1998 (JP) .................................................. 10-119266

(51) Int. Cl.$^7$ ...................................................... H02G 3/04
(52) U.S. Cl. ........................ 174/72 A; 174/99 R; D8/356
(58) Field of Search .............................. 174/68.3, 71 R, 174/72 R, 72 A, 97, 99 R, 101; 138/108, 106, 162; D8/356

(56) References Cited

U.S. PATENT DOCUMENTS

| | | | | |
|---|---|---|---|---|
| D. 363,877 | * | 11/1995 | Dee ........................................ | D8/373 |
| D. 395,001 | * | 6/1998 | Stebbins ................................ | D8/394 |
| D. 417,838 | * | 12/1999 | Kim ...................................... | D8/396 |
| 5,352,855 | * | 10/1994 | Potter ................................... | 174/135 |
| 5,401,905 | * | 3/1995 | Lesser et al. ...................... | 174/99 R |
| 5,739,468 | * | 4/1998 | Rossman et al. ................... | 174/65 G |

FOREIGN PATENT DOCUMENTS

| | | | | |
|---|---|---|---|---|
| 2357728 | * | 11/1973 | (DE) . | |
| 559340-A1 | * | 9/1993 | (EP) . | |
| 64-43014 | | 2/1989 | (JP) | ................................ H02G/3/26 |
| 1-81610 (A) | * | 3/1989 | (JP) . | |
| 4-133094 | | 12/1992 | (JP) | ................................ F16L/33/00 |
| 5-88131 | | 11/1993 | (JP) | ................................ H02G/3/04 |
| 7-95714 | | 4/1995 | (JP) | ................................ H02G/3/04 |

* cited by examiner

*Primary Examiner*—Dean A. Reichard
*Assistant Examiner*—Adolfo Nino
(74) *Attorney, Agent, or Firm*—Sughrue, Mion, Zinn, Macpeak & Seas, PLLC (57) ABSTRACT

A protector for fixing a wire harness comprises a protector body having a chamber for accommodating the wire harness, a flexible band member one end of which is supported by one side wall of the protector body as a base end and the other end of which is a free end drawable inside the chamber, the flexible band including a first engaging member on the free end thereof, and a locking member provided on an inner face of the chamber, the locking member arranged so as to be able to lock the first engaging member of the band member which is wound on an outer periphery of the wire harness accommodated within the chamber.

8 Claims, 8 Drawing Sheets

PRIOR ART

FIG. 8

PRIOR ART

FIG. 9

PRIOR ART

PROTECTOR FOR FIXING WIRE HARNESS

BACKGROUND OF THE INVENTION

The present invention relates to a protector for fixing a wire harness in which, for example, a wire harness covered with a corrugated tube is fixed.

Figure 8:
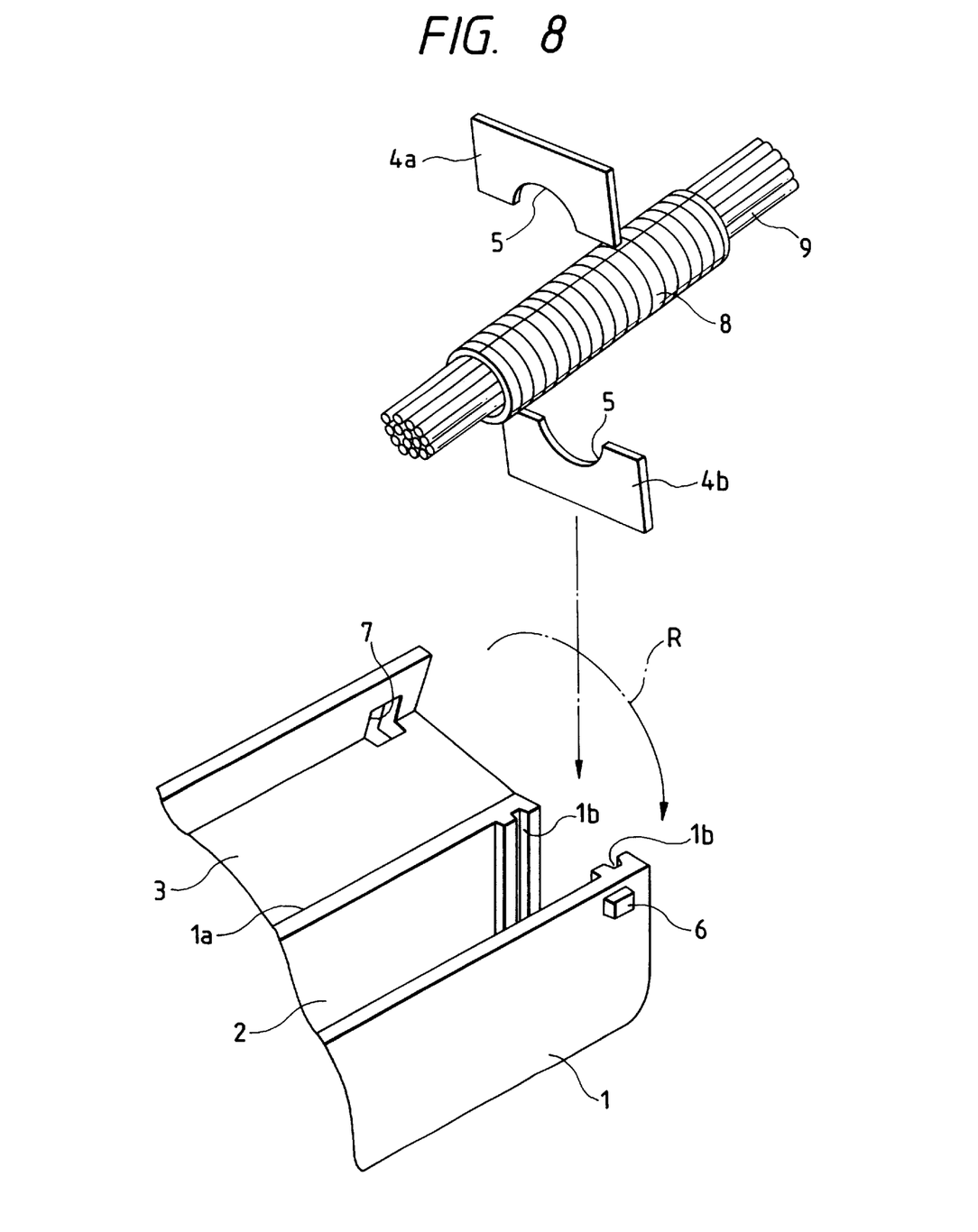
FIG. 8 is an exploded perspective view of a related protector for a fixing wire harness.

When a plurality of pieces of wire harness are drawn around in the same route, it is common to use a protector so that the plurality of pieces of wire harness, which are gathered into one body or covered with a corrugated tube after having been gathered, can be protected by the protector for the prevention of damage caused by the contact with other members arranged close to the wire harness. As shown in FIG. 8, Unexamined Japanese Utility Model Publication No. 5-88131 discloses a related structure of this type protector for fixing the wire harness.

As shown in FIG. 8, there is provided a harness accommodation chamber 2 in a protector body 1. An opened face of this harness accommodation chamber 2 can be opened and closed by a cover 3 connected to the protector body 1 via a hinge 1a. On the harness accommodation chamber 2 side of the protector body 1, there is provided a guide groove 1b. A pair of spacers 4a, 4b are insertable into this guide groove 1b. A semicircular notch 5 is formed in each of the pair of spacers 4a, 4b. Outside the protector body 1, there is provided an engaging protrusion 6. In a portion of the cover 3, there is formed an engaging hole 7.

In the above structure, the lower spacer 4b is inserted into the guide groove 1b of the protector body 1. Then, wire harness 9 covered with a corrugated tube 8 is inserted into the wire harness accommodation chamber 2. At this time, the wire harness 9 covered with the corrugated tube 8 is arranged in the notch 5 of the lower spacer 4b. Then, the upper spacer 4a is inserted into the guide groove 1b of the protector body 1, and the wire harness 9 covered with the corrugated tube 8 is arranged in the notch 5 of the upper spacer 4a. When the cover 3 is rotated in the direction of an arrow R and set at a closed position, the engaging protrusion 6 enters the engaging hole 7 and is locked. When the locked cover 3 restricts movements of the spacers 4a, 4b, the wire harness 9 can be fixed.

Figure 9:
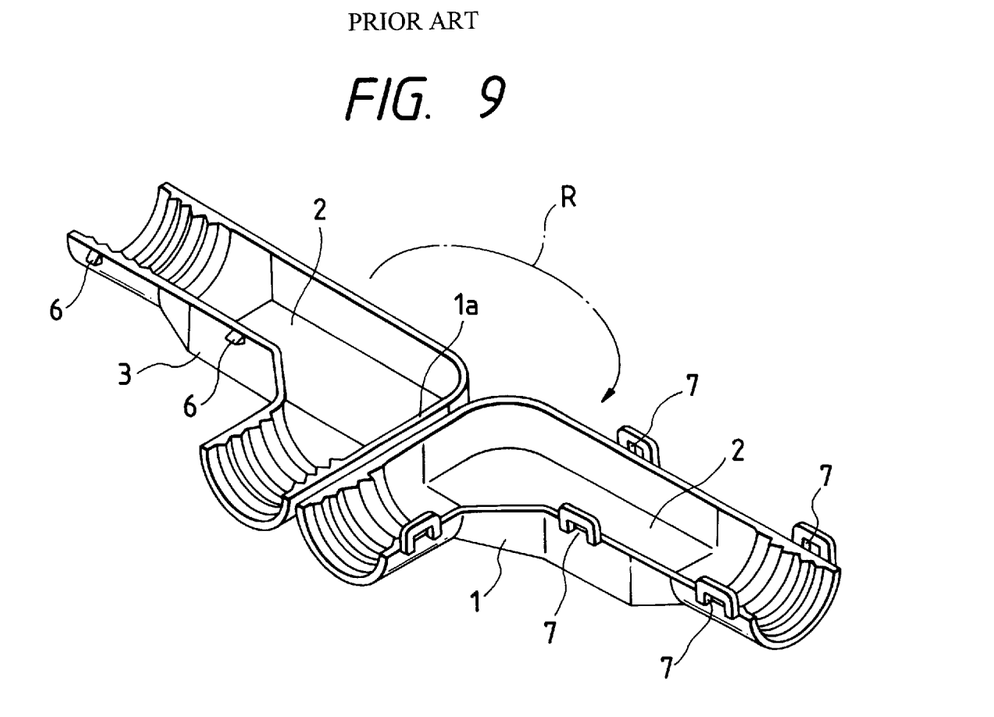
FIG. 9 is a perspective view of another related protector for fixing a wire harness.

As shown in FIG. 9, Unexamined Japanese Utility Model Publication No. 4-133094 discloses another related example. In the structure, a protector body 1 and a cover 3 connected thereto by a hinge 1a are respectively formed into an L-shape, and a harness accommodation chamber 2 is composed inside the protector body 1. In the protector body 1, there is formed an engaging hole 7. On the cover 3, there is provided an engaging protrusion 6.

In the above structure, when a bundle of pieces of wire harness (not shown) or a plurality of pieces of wire harness covered a corrugated tube (not shown) are inserted into the wire harness accommodation chamber 2 and the cover 3 is rotated in the direction of arrow R and set at the closed position, the engaging protrusion 6 is made to get into the engaging hole 7 and locked. The wire harness is fixed when movements thereof are restricted by the inner faces of the protector body 1 and the cover 3.

Figure 10:
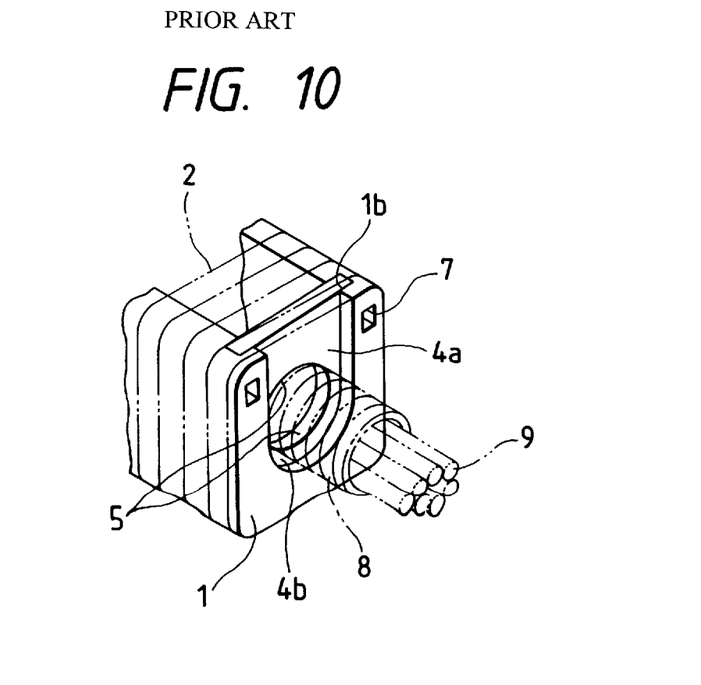
FIG. 10 is a perspective view of still another related protector for fixing a wire harness.

Still another related example of a structure of a protector for fixing a wire harness is disclosed in Unexamined Japanese Utility Model Publication No. 5-88131 as shown in FIG. 10. In this figure, there is formed a harness accommodation chamber 2 in a protector body 1. On the harness accommodation chamber 2 side, there is formed a guide groove 1b. A pair of spacers 4a, 4b are inserted into the guide groove 1b. In each of the pair of spacers 4a, 4b, there is formed a semicircular notch 5. Outside the protector body 1, there is formed an engaging hole 7. In the upper spacer 4a, there is provided an engaging protrusion (not shown).

In the above structure, the lower spacer 4b is inserted into the guide groove 1b of the protector body 1. Then, the wire harness 9 covered with a corrugated tube 8 is inserted into the harness accommodation chamber 2. Next, the upper spacer 4a is inserted into the guide groove 1b of the protector body 1. Due to the foregoing, the wire harness 9 is gradually arranged in the notches of the pair of spacers 4a, 4b. At the same time, the engaging protrusion of the upper spacer 4a engages with the engaging hole 7 and is locked. When the engaging protrusion is locked by the engaging hole 7, movements of the pair of spacers 4a, 4b are restricted and thereby the wire harness 9 can be fixed.

However, the following problems may be encountered in the above related structures. Movements of the wire harness 9 covered with the corrugated tube 8 are restricted by the spacers 4a, 4b. Alternatively, movements of the wire harness 9 covered with the corrugated tube 8 are restricted by the inner faces of the protector body 1 and the cover 3. For the above reasons, only a corrugated tube 8, the diameter of which is predetermined, and only pieces of wire harness 9, the entire diameter of which is predetermined, can be fixed by the above related structures. Accordingly, it is necessary to change the protector according to the diameter of the corrugated tube 8 or the wire harness 9. Alternatively, it is necessary to change the spacers 4a, 4b, the diameters of the notches 5 of which are different.

In the related structures, when the corrugated tube 8 or the wire harness 9 is given an external force, this external force acts on the cover 3 and the spacer 4a. Accordingly, the cover 3 is deflected and deformed by the external force given to the corrugated tube 8 and the wire harness 9, and the engaging protrusion 6 is disengaged from the engaging hole 7. In this case, there is a possibility that the cover 3 is disconnected from the protector body.

SUMMARY OF THE INVENTION

The present invention has been accomplished to solve the above problems. It is an object of the present invention to provide a structure of a protector for fixing wire harness wherein the wire harness can be fixed irrespective of the diameters of the corrugated tube and the wire harness; and the cover is not disengaged from the protector body by an external force given to the wire harness. Also, it is an object of the present invention to provide a structure of a protector for fixing wire harness, which can be manufactured by integral molding, characterized in that: the wire harness can be fixed irrespective of the diameters of the corrugated tube and the wire harness; and the cover is not disengaged from the protector body by an external force given to the wire harness.

In order to achieve the above object, there is provided a protector for fixing a wire harness comprising: a protector body having a chamber for accommodating the wire harness; a flexible band member one end of which is supported by one side wall of the protector body as a base end and the other end of which is a free end drawable inside the chamber, the flexible band including a first engaging member on the free end thereof; a locking member provided on an inner face of the chamber, the locking member arranged so as to be able to lock the first engaging member of the band member which is wound on an outer periphery of the wire harness accommodated within the chamber.

In the protector, the first engaging member is formed on the free end side of the band member with a predetermined length.

According to the protector for fixing wire harness, the band member is directly wound round a bundle of wire harness or a plurality of pieces of wire harness covered with a corrugated tube which are accommodated in the chamber, and the first engaging member of the wound band member is locked by the locking member. Therefore, a fastening position of fastening the band member can be freely changed according to the diameter of the wire harness. Since the wire harness is accommodated in the chamber being directly fastened by the band member or being fastened by the band member via the corrugated tube, when an external force is given to the wire harness, this external force acts on the protector body via the band member. Since the locking member is provided on the inner face of the chamber and not exposed to the outside of the protector body, there is no possibility that the locking member comes into contact with other members arranged in the proximity.

In the protector, the locking member includes a locking passage through which the band member is passed and a second engaging member formed inside of the locking passage for engaging with the first engaging member of the band member, and an opening communicating to outside of the protector body, through which the band member wound on the wire harness is passed, is formed on a side wall of the protector body opposing to an exit of the locking passage.

Accordingly, since the free end of the band member is exposed outside from the opening via the locking passage, it is possible to fasten the band by pulling this free end of the band. Whereby, the operability can be improved.

It may be configured that: the base end of the band member is integrally connected with a face of the locking member on which the exit of the locking passage is provided; an extending direction of the locking passage is parallel with a direction of which the band member extends straight; and the opening is larger than the size of the locking member.

According to this structure, the band member and the protector body can be integrally molded.

In the above protector, the locking passage is arranged closer to the inner face of the chamber with respect to the base end of the band member.

According to this structure, the free end of the band member, which winds round the wire harness or the wire harness covered with the corrugated tube, passes through an outer circumference of the band on the base end side. Therefore, the wire harness can be tightly fastened by the band member.

It may be configured that: the locking member includes a retaining portion for retaining the base end of the band member; and the opening is larger than the size of the locking member including the retaining portion.

It may be configured that: the free end of the band member is tapered such that the thickness thereof is gradually reduced toward the distal end thereof.

Accordingly, the free end of the band member can be easily inserted into the locking passage and thereby the operability is further improved.

DETAILED DESCRIPTION OF THE PREFERRED EMBODIMENTS

Referring to the accompanying drawings, an embodiment of the present invention will be explained below.

Figure 1A:
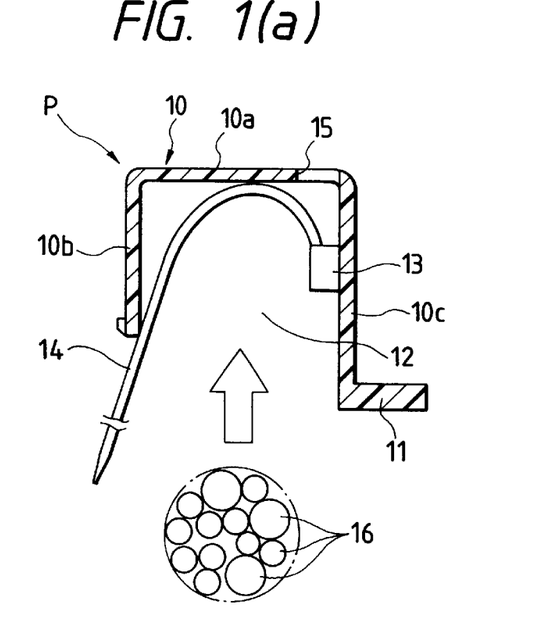
FIGS. 1(a) and (b) are cross-sectional views of a protector of the first embodiment according to the present invention showing a work for fixing wire harness.
Figure 1B:
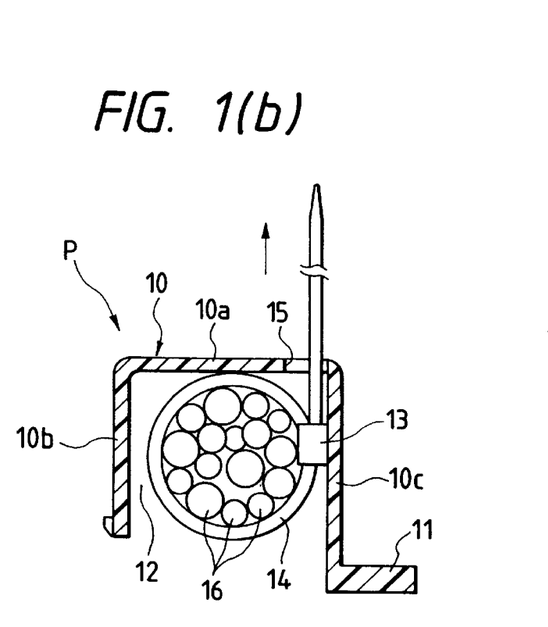
Figure 1C:
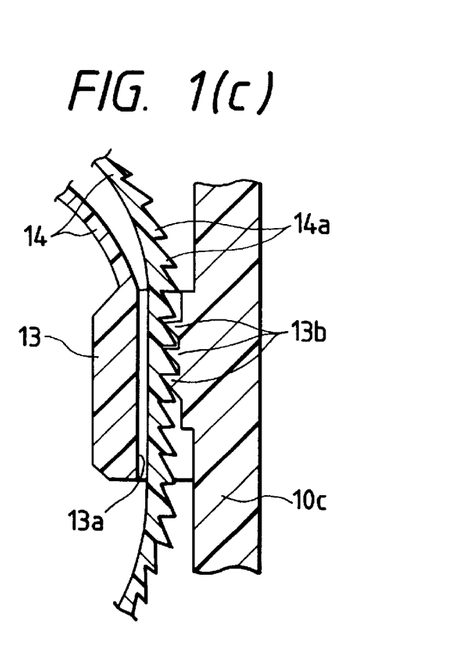
FIG. 1(c) is an enlarged cross-sectional view of a locking member of the above protector body showing a locking condition.
Figure 2A:
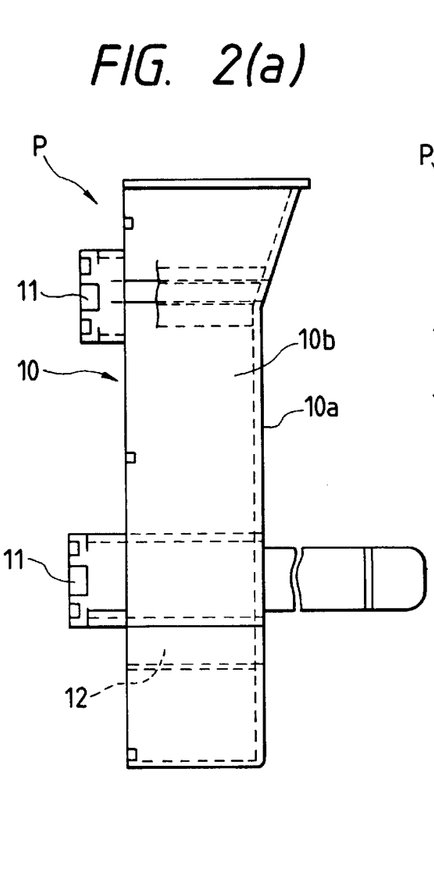
FIG. 2(a) is a left side view of a protector body of FIG. 1.
Figure 2B:
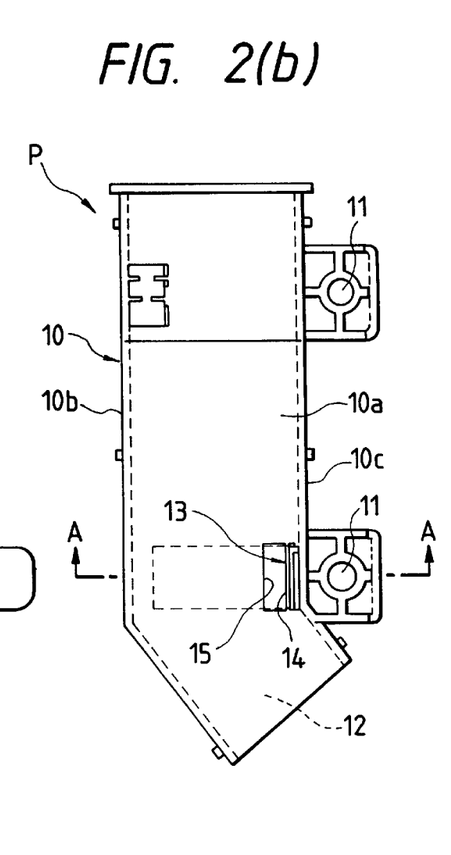
FIG. 2(b) is a plan view of the protector body of FIG. 1.
Figure 2C:
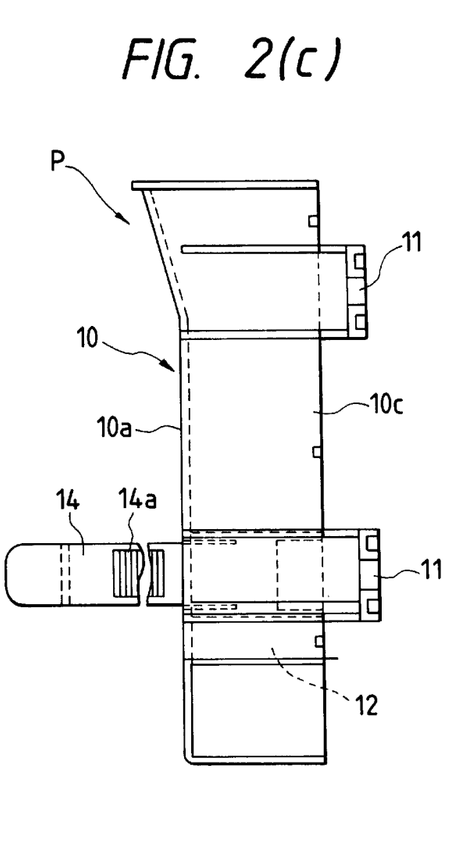
FIG. 2(c) is a right side view of the protector body of FIG. 1.
Figure 3:
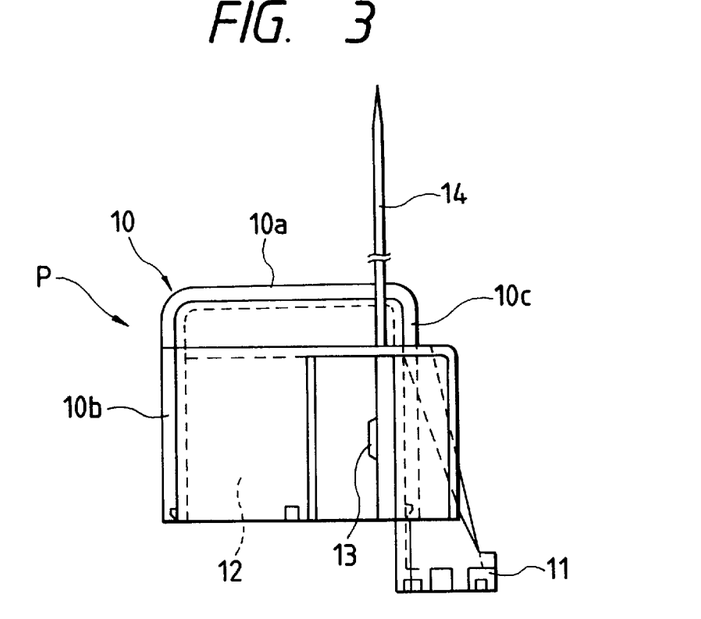
FIG. 3 is a front view of the protector body of FIG. 1.
Figure 4:
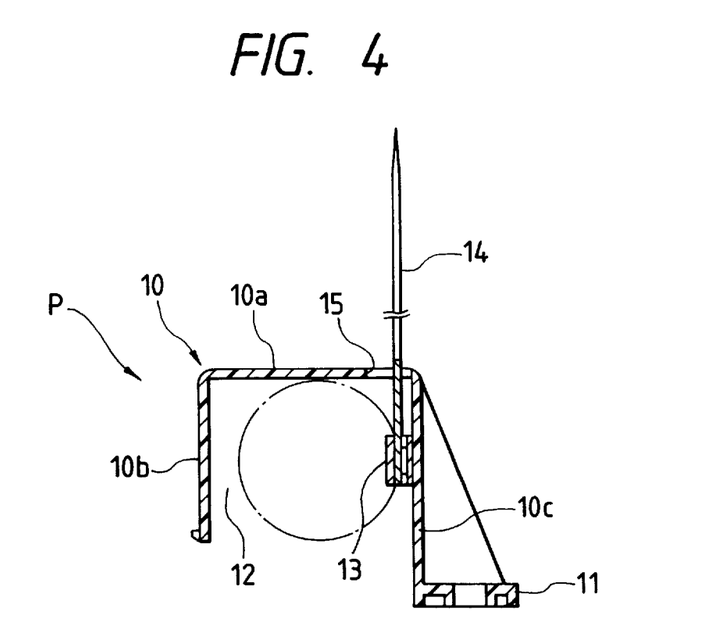
FIG. 4 is a cross-sectional view taken along the line A—A in FIG. 2(b)

FIGS. 1 to 4 are views showing a first embodiment of the present invention. FIG. 2(a) is a left side view of a protector P. FIG. 2(b) is a plan view of the protector P. FIG. 2(c) is a right side view of the protector P. FIG. 3 is a front view of the protector P. FIG. 4 is a cross-sectional view taken along the line A—A in FIG. 2(b).

As shown in FIGS. 2 to 4, a protector P comprises a protector body 10 and a cover (not shown). The protector body 10 and the cover are detachably engaged with each other by an engaging member (not shown). The protector body 10 includes: an upper plate 10a; a left side plate 10b vertically arranged downward at one end of the upper plate 10a; and a right side plate 10c vertically arranged downward at the other end of the upper plate 10a. A lower side of the protector body 10 is opened. One end side of the protector body 10 is curved to the right in the figure, and the other end side of the protector body 10 is gradually raised when it comes to the end portion. Outside the right side plate 10c, there is provided an attaching section 11 for attaching the protector P onto an external device.

An inner space surrounded by the upper face plate 10a, left side plate 10b and right side plate 10c is formed into a harness accommodation chamber 12. An upper face side of this harness accommodation chamber 12 is closed by the cover.

On an inner face of the right side plate 10c, there is provided a locking member 13 for locking the band 14. A base end of the band 14 is fixed at a position distant from the right side plate 10c on an upper face of this locking member 13. A free end of the band 14 can be freely drawn in the harness accommodation chamber 12 inside the opening 15. As the base end of the band 14 is fixed onto the upper face of the locking member 13, a direction in which the band 14 extends straight is set on an upper face which is opposed to an opened face of the harness accommodation chamber 12. In this first embodiment, the band fixing section for fixing the band 14 is also used as the locking member 13.

The band 14 is flexible. At the free end of the band 14, there is formed a sawteeth-shaped engaging portion 14*a* which is arranged over a predetermined length of the band 14 in the longitudinal direction. The free end of the band 14 is tapered in such a manner that the thickness of the band is gradually reduced when it comes to the end.

As the details are shown in FIG. 1(*c*), in the locking member 13, there is provided a locking passage 13*a* in which the band 14 is to be passed through. This locking passage 13*a* is arranged on the side closer to the right side plate 10*c* than a portion on which the base end of the band 14 is fixed. The extending direction of this locking passage 13*a* is set on the lower face of the harness accommodation chamber 12, which is an opened face, and also set on the upper face, which is an opposed face of the opened face. In the locking passage 13*a*, there is provided a protruding-claw-shaped portion 13*b* to be engaged with the engaging portion 14*a* of the band 14.

On the other hand, there is formed an opening 15 on the upper plate 10*a* which is an opposed face to the opened face. This opening 15 is located right above the locking member 13, namely, exit side of the locking passage 13*a*. The band 14, which has been passed through the locking passage 13*a* and extends straight, passes through the opening 15. The size of the opening 15 is larger than the size of the upper face of the locking member 13.

Figure 11:
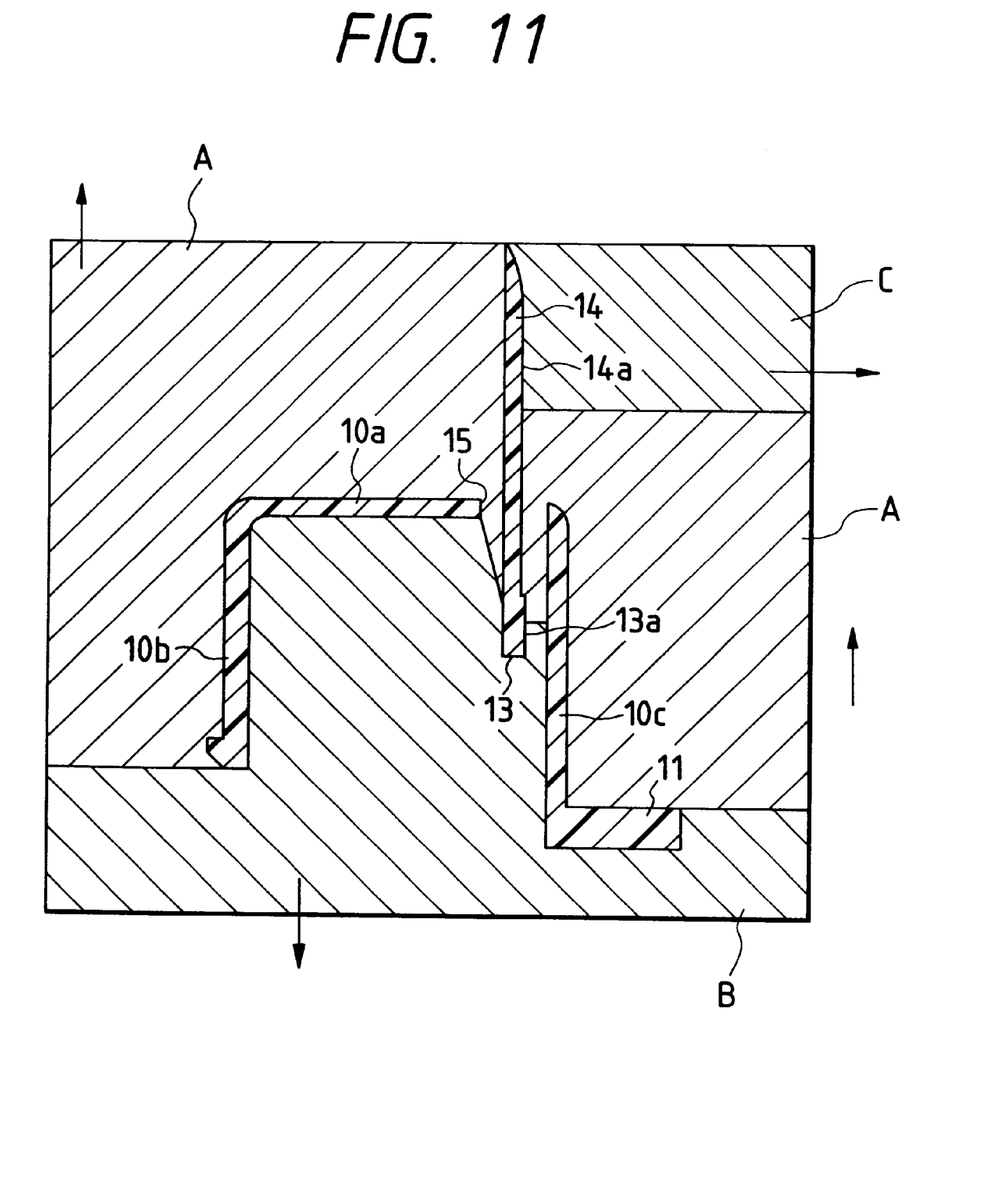
FIG. 11 is a section view showing a process for molding the protector body of FIG. 1.

According to the protector body 10 of this structure, it is possible to integrally mold the band 14 having the engaging portion 14*a* and locking member 13 having the locking passage 13*a* and the claw portion 13*b* together with the protector body 10 by use of the molds A, B and C shown in FIG. 11.

Next, explanations will be made to a procedure of fixing the wire harness 16 in the protector body 10 manufactured in this way. Immediately after the manufacture, the protector body 10 is kept in a condition shown in FIGS. 3 and 4. First of all, since the band is flexible, the free end of the band 14, which is protruding to an upper portion of the upper plate 10*a*, is inserted into the opening 15, so that the band 14 can be arranged in the harness accommodation chamber 12. Next, a large number of pieces of wire harness 16, which are bundled into one body, or a bundle of pieces of wire harness 16, which are covered with a corrugated tube, are inserted into the harness accommodation chamber 12 as shown in FIG. 1(*a*).

Then, the band 14 is directly wound round the wire harness 16 accommodated in the wire harness accommodation chamber 12. The free end of this band 14, which has been wound round the wire harness 16, is inserted into the locking passage 13*a* of the locking member 13. In this case, the free end of the band 14 is tapered, that is, the thickness of the free end of the band 14 is gradually decreased when it comes to the forward end. Therefore, it can be easily inserted into the locking passage 13*a*.

After the free end of the band 14 has gotten out from the locking passage 13*a*, it goes outside from the opening 15 of the upper plate 10*a*. Accordingly, when the free end of the band 14, which protrudes outside, is pulled, the band 14 can be fastened. At this maximum fastening position, the engaging portion 14*a* of the band 14 is engaged with the claw portion 13*b*. Therefore, the band 14 is set in the condition shown in FIG. 1(*b*) and the wire harness 16 can be fixed. Finally, the cover is attached to the protector body 10 so that the opened face of the harness accommodation chamber 12 can be closed. In this way, the wire harness 16 can be completely fixed in the protector body 10.

A bundle of pieces of wire harness 16 or a large number of pieces of wire harness 16 covered with a corrugated tube are fastened by the band 14 and accommodated in the harness accommodation chamber 12. Therefore, the fastening position of the band 14 can be freely adjusted. Consequently, the wire harness 16 can be tightly fastened irrespective of the diameters of the corrugated tube and the wire harness 16.

Since the wire harness 16 is accommodated in the harness accommodation chamber 12 while it is being fastened by the band 14 directly or via the corrugated tube, when the wire harness 16 is given an external force, this external force acts only on the locking member 13 of the protector body 10 via the band 14. That is, no external force acts on the cover. Accordingly, the cover is not disconnected from the protector body 10 by the external force given to the wire harness 16.

Since both the base end and the engaging portion of the band 14 are arranged in the locking member 13, no external force acts on the protector body 10 even if the band 14 is fastened. Accordingly, there is no possibility that the cover is disconnected from the protector body 10 by the fastening force given to the band 14. Further, even when the band 14 is strongly fastened, there is no possibility that the protector body 10 is deformed by deflection. Accordingly, it is possible to fasten the band 14 strongly, and the working property can be enhanced.

The locking member 13 is arranged inside the protector body 10, that is, the locking member 13 is not exposed outside the protector body 10. Accordingly, there is no possibility that the locking member 13 is given impact when it comes into contact with a member arranged in the proximity of the locking member 13. In the same manner, since the locking member 13 is not exposed outside the protector body 10, an outward appearance thereof is good. Since the fastening can be achieved only by pulling the free end of the band 14 projected outside of the upper plate 10*a*, the operability for fixing the wire harness can be improved.

In the first embodiment described above, although the base end of the band 14 is integrally fixed to the locking member 13, and the band fixing section is also used as the locking member 13, the band fixing section and the locking member may be provided separately from each other. However, when the band fixing section and the locking member are provided separately from each other, the band 14 extending straight passes in the opening 15 of the upper plate 10*a*, and it is necessary that the opening 15 is formed larger than the upper faces of the band fixing section and the locking member 13, that is, the size of the opening 15 is necessarily extended. On the other hand, when the band fixing section is also used as the locking member 13 as explained in the above first embodiment, the size of the opening 15 of the upper plate 10*a* may be reduced so that only the band 14 extending straight can pass in the opening 15 and further the size of the opening 15 can be only larger than the upper face of the locking member 13. Therefore, the mechanical strength of the protector body 10 can be enhanced and the wire harness 16 can be positively enhanced.

In the above first embodiment, the lock passage 13*a* is arranged in a portion closer to the right side plate 10*c* of the protector body 10, to which the locking member 13 is fixed, than a portion to which one end of the band 14 is fixed. Therefore, the free end of the band 14 wound round the wire harness 16 passes on an outer circumference of the band 14 on one end side, and the band is fastened all over the outer circumference. Accordingly, the wire harness 16 can be tightly fastened.

Figure 5:
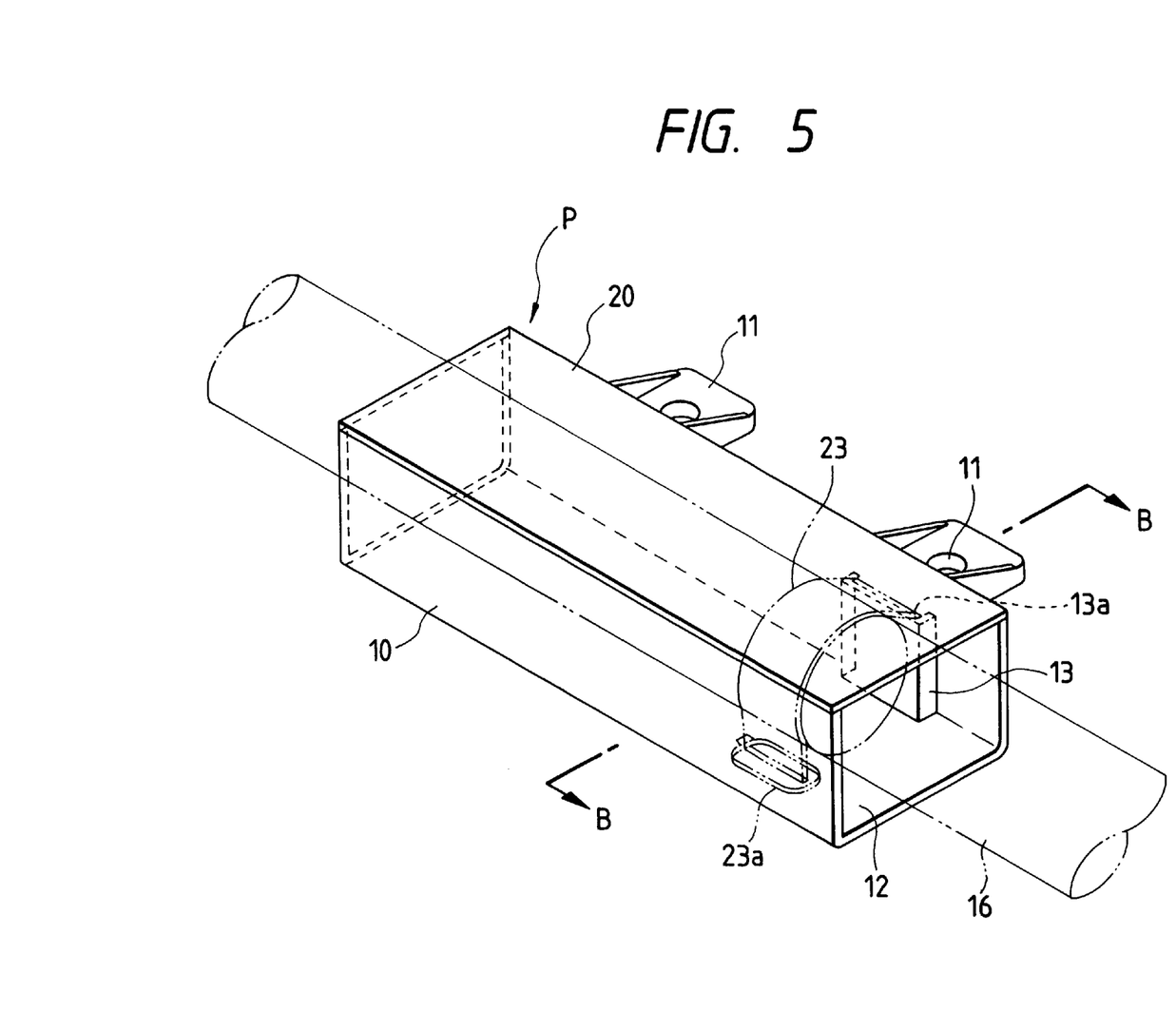
FIG. 5 is a perspective view showing a fixing condition of wire harness by a protector of the second embodiment according to the present invention.
Figure 6:
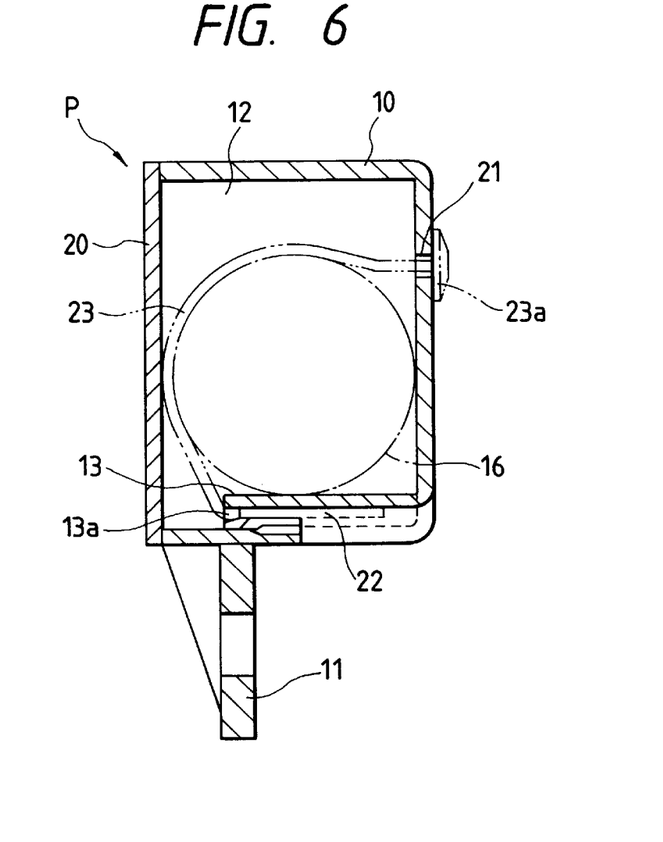
FIG. 6 is a cross-sectional view taken along the line B—B in FIG. 5.
Figure 7:
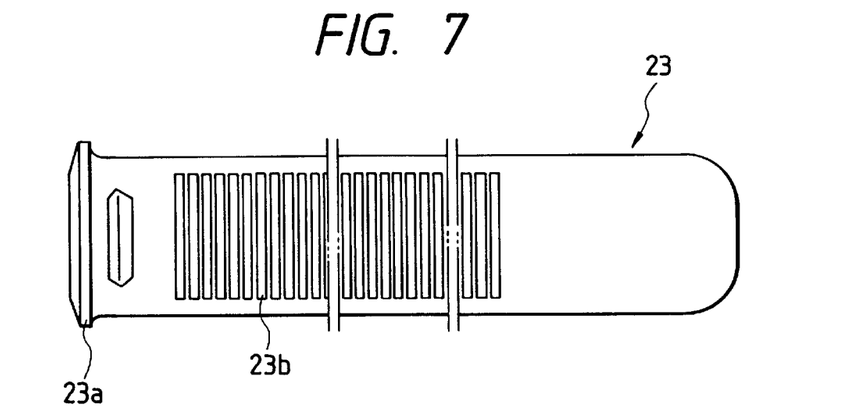
FIG. 7 is a plan view of a band of the protector of FIG. 5.

FIGS. 5 to 7 are views showing a second embodiment of the present invention. FIG. 5 is a perspective view showing a state of fixing the wire harness 16 by a protector P. FIG. 6 is a cross-sectional view taken along the line B—B in FIG. 5. FIG. 7 is a plan view of a band.

As shown in FIGS. 5 and 6, the protector P is composed of a protector body 10 and a cover 20. The protector body 10 and the cover 20 are arranged being freely detached from each other by an engaging member (not shown). In the protector body 10, there is formed a harness accommodation chamber 12, the three sides of which are surrounded by plates. On the opened face side of this harness accommodation chamber 12, there is provided a cover 20 which can be freely attached to and detached from the harness accommodation chamber 12.

On a plate of the protector body 10, there is formed a band engaging hole 21. On an inner face of a plate adjacent to the plate on which the band engaging hole 21 is formed, there is provided a locking member 13 having a locking passage 13a. The structure of this locking member 13 is the same as that of the first embodiment described before. Therefore, the explanation is omitted here. On the exit side of the locking passage 13a, there is formed an opening 22 communicating to the outside. In this connection, reference numeral 11 shown in FIGS. 5 and 6 is an attaching section.

As the details are shown in FIG. 7, the band 23 is provided separately from the protector body 10. At the base portion of the band 23, there is provided a flange 23a. In the same manner as that of the first embodiment, on the free end of the band 23 with respect to the base section, there is provided an engaging portion 23b in a predetermined range.

Next, explanations will be made to a procedure of fixing the wire harness 16 in the protector P. First, the free end of the band 23 is inserted into the band engaging hole 21 of protector body 10. When the band 23 is further inserted into the band engaging hole 21, the flange 23a of the band 23 is engaged with the band engaging hole 21, so that the band 23 can be supported by the protector body 10. Next, a large number of pieces of wire harness 16, which have been gathered into one body, or a large number of pieces of wire harness 16, which have been covered with a corrugated tube, are inserted into the harness accommodation chamber 12.

Next, the band 23 is directly wound round the wire harness 16, and the free end of the band 23, which has been wound round the wire harness 16, is inserted into the locking passage 13a of the locking member 13. The free end of the band 23, which has come out from the locking passage 13a, comes outside from the opening 22. Therefore, when the free end of the band 23 protruding outside is pulled, the band can be fastened. At this maximum fastening position, the engaging portion 23b of the band 23 is engaged with a claw portion (no reference numeral is applied), as shown in FIG. 6. In this way, the wire harness 16 can be fixed. Finally, the cover 20 is attached to the protector body 10, and the opened face of the harness accommodation chamber 12 is closed by the cover 20. In this way, the wire harness 16 can be completely fixed to the protector P.

In this second embodiment, in the same manner as that of the first embodiment described before, a bundle of pieces of wire harness 16 or a large number of pieces of wire harness 16 covered with a corrugated tube are fastened by the band 23 and accommodated in the harness accommodation chamber 12. Therefore, the fastening position of the band 23 can be freely adjusted. Consequently, the wire harness 16 can be tightly fastened irrespective of the diameters of the corrugated tube and the wire harness 16. Since the wire harness 16 is accommodated in the harness accommodation chamber 12 while it is being fastened by the band 23 directly or via the corrugated tube, when the wire harness 16 is given an external force, this external force acts on the protector body 10 via the band 23. That is, no external force acts on the cover 20. Accordingly, the cover is not disconnected from the protector body 10 by the external force give to the wire harness 16.

This second embodiment can provide the following advantages. In the same manner as that of the first embodiment, the locking member 13 is arranged inside the protector body 10 and not exposed outside the protector body 10. Accordingly, the locking member 13 is not given impact by coming into contact with a member arranged in the proximity of the locking member 13. Since the locking member 13 is not exposed outside the protector body 10, an outward appearance thereof is good. Since the fastening can be achieved only by pulling the free end of the band 23 projected outside of the protector body 10, the operability for fixing the wire harness 16 can be improved.

In the first and the second embodiment described before, the locking passage 13a is formed into a hole, all sides of which are closed. However, it should be noted that one side may be opened. When this arrangement in which one side is open is adopted, the bands 14, 23 can be easily inserted.

As has been described heretofore, according to the present invention, a fastening position of fastening the band can be freely changed according to the diameter of the wire harness irrespective of the diameters of the wire harness and the corrugated tube. Since the wire harness is accommodated in the harness accommodation chamber being directly fastened by the band or being fastened by the band via the corrugated tube, when an external force is given, this external force acts on the protector body via the band, and this external force does not act on the cover. Therefore, the cover is not disconnected from the protector body. Since the locking member is provided on the harness accommodation chamber side of the protector body and not exposed to the outside of the protector body, there is no possibility that the locking member comes into contact with other members in the proximity and receives impact. Accordingly, the locking member is not damaged by impact given from the outside.

According to the present invention, since the fastening can be achieved only by pulling the free end of the band projected outside of the protector body, the operability for fixing the wire harness can be improved.

Furthermore, since the locking passage is arranged closer to the inner face side of the protector body, to which the locking member is provided, with respect to a portion in which the base end of the band is fixed, the free end of the band, which winds round the wire harness, passes through an outer circumference of the band on the base end side, and the band is fastened all over the outer circumference of the wire harness. Therefore, the wire harness can be tightly fastened by the band.

According to the present invention, when it is configured that the base end of the band is integrally fixed to the upper face of the locking member, it is possible to manufacture the protector body and the band by means of integral molding.

Furthermore, the opening can be made small. Accordingly, it is possible to enhance the mechanical strength of the protector body, and further the wire harness can be more positively protected.

What is claimed is:

1. A protector for fixing a wire harness comprising:
   a protector body having side walls defining a chamber for accommodating the wire harness and an opening on one of the side walls;
   a flexible band member, one end of the band member being supported by one side wall of the protector body as a base end and the other end of the band member being a free end drawable inside the chamber and extendable outside of the opening of the protector body, and including a first engaging member thereon; and
   a locking member unitarily provided on an inner face of the chamber, the locking member arranged so as to be able to lock the first engaging member of the band member which is wound on an outer periphery of the wire harness accommodated within the chamber.

2. The protector as set forth in claim 1, wherein the locking member includes a locking passage through which the band member is passed and a second engaging member formed inside of the locking passage for engaging with the first engaging member of the band member, and
   wherein the opening is formed on a side wall of the protector body opposite to an exit of the locking passage.

3. The protector as set forth in claim 2, wherein the base end of the and member is integrally connected with a face of the locking member on which the exit of the locking passage is provided,
   wherein an extending direction of the locking passage is parallel with a direction in which the band member extends straight, and
   wherein the opening is larger than the size of the locking member.

4. The protector as set forth in claim 3, wherein the locking passage is arranged closer to the inner face of the chamber with respect to the base end of the band member.

5. The protector as set forth in claim 2, wherein the locking member includes a retaining portion for retaining the base end of the band member, and
   wherein the opening is larger than the size of the locking member including the retaining portion.

6. The protector as set forth in claim 5, wherein the locking passage is arranged closer to the inner face of the chamber with respect to the base end of the band member.

7. The protector as set forth in claim 1, wherein the free end of the band member is tapered such that the thickness thereof is gradually reduced toward the distal end thereof.

8. The protector as set forth in claim 1, wherein the first engaging member is formed on the free end side of the band member with a predetermined length.

* * * * *